United States Patent [19]
Galanti et al.

[11] Patent Number: 5,845,098
[45] Date of Patent: Dec. 1, 1998

[54] ADDRESS LINES LOAD REDUCTION

[75] Inventors: David Galanti, Natania; Eitan Zmora, Jerusalem; Natan Baron, Oranit, all of Israel; Kevin Kloker, Palatine, Ill.

[73] Assignee: Motorola Inc., Schaumburg, Ill.

[21] Appl. No.: 669,680

[22] Filed: Jun. 24, 1996

[51] Int. Cl.[6] .................................................. G06F 13/40
[52] U.S. Cl. .......................... 395/307; 395/309; 395/401
[58] Field of Search .................................... 395/306, 307, 395/308, 309, 310, 401–405

[56] References Cited

U.S. PATENT DOCUMENTS

| | | | |
|---|---|---|---|
| 3,787,820 | 1/1974 | Sherman | 340/172.5 |
| 4,286,321 | 8/1981 | Baker et al. | 364/200 |
| 4,374,410 | 2/1983 | Sakai et al. | 364/200 |
| 5,148,539 | 9/1992 | Enomoto et al. | 395/425 |
| 5,235,684 | 8/1993 | Becker et al. | 395/325 |
| 5,359,717 | 10/1994 | Bolwes et al. | 395/325 |
| 5,473,575 | 12/1995 | Farmwald et al. | 365/230.06 |
| 5,638,520 | 6/1997 | Moyer | 395/308 |

*Primary Examiner*—Ayaz R. Sheikh
*Assistant Examiner*—Jigar Pancholi
*Attorney, Agent, or Firm*—Robert M. Handy

[57] ABSTRACT

Subsystems (12–20) are coupled by a bus (44) which includes higher order address lines (62, 64) and lower order address lines (60). One or more subsystems (20) has an address connection (202) for receiving lower order addresses (76') identifying an address space (INT) within this subsystem (20). This connection (202) is coupled to the higher order address lines (62, 64) of the bus (44). An address generator (22) provides subsystem select (CS) addresses and lower order (INT) addresses. A control means (24) coupled between the address generator (22) and the bus (44), uses the subsystem select (CS) addresses to dynamically couple the lower order (INT) addresses from the address generator (22) to the higher order bus lines (62, 64) when the subsystem select (CS) address is for the chosen subsystem (20). This reduces the number of subsystems (12–20) coupled to the lower order bus lines (60) and helps equalize bus (44) loading.

8 Claims, 4 Drawing Sheets

ADDRESS LINES LOAD REDUCTION

FIELD OF THE INVENTION

The present invention concerns a means and method for a system employing a multiline bus to communicate between a processor and subsystems.

BACKGROUND OF THE INVENTION

It is common in the electronic art to employ a bus to communicate between a processor and various parts of the system which are referred to as subsystems. The subsystems can perform many different functions and each can have a different internal address space, that is, the range of addresses that needed to address each subsystem can be different. For example, assume that the bus has N+1 lines, each line being set to a "1" or "0" according to the desired address. By definition, certain lines of the bus carry the most significant bits (MSB) of the address and other lines carry the least significant bits (LSB) of the address and intermediate lines carry intermediate bits (IB) of the address.

Usually, the MSB identify the subsystem being addressed. These addresses are often referred to as the "chip select" or "CS" addresses or information and the corresponding bus lines or bus on which the CS addresses or information are placed are referred to as the CS lines or bus. As used herein, the words "chip select" and the abbreviation "CS" are intended to refer generally to the addresses or information which identify particular subsystems, and the bus lines on which such addresses appear, whether or not the subsystem consists of a single integrated circuit (IC) or a collection of IC's and other devices.

Each subsystem is preprogrammed to recognize a certain configuration of, for example the MSB, which are its CS address. The number of MSB bits required for the CS addresses are determined by the number of subsystems that must be accommodated. The LSB provide the addresses within the selected subsystem with which the processor (or other subsystem) needs to communicate. These are referred to as the "internal" or "INT" addresses and can be different or the same for each subsystem.

In the prior art, it has been customary to connect most or all of the subsystems to the MSB and LSB lines of the bus. When the MSB lines carry the CS addresses they are usually coupled to all subsystems. Some of the LSB lines are coupled to all of the subsystems and others to only some of the subsystems. The number of LSB lines connected to a particular subsystem depends upon the INT address space within each subsystem.

For convenience of explanation, the address and bus naming convention (A:B) is adopted where "A" represents the MSB of a particular address or bus and "B" represents the LSB of the address or bus and the combination (A:B) indicates the range (A;A−1;A−2; . . . B+2;B+1;B). For example, a sixteen line bus is denoted as having an address space (or number of bus lines) of (15:0), standing in this case for addresses or bus lines (15;14;13; . . . 3;2;1;0). Assume further that there are five subsystems coupled to the bus, wherein the first subsystem needs for its internal address space 7 LSB lines denoted as (6:0), the second subsystem needs 8 LSB lines denoted as (7:0), the third needs 12 LSB lines denoted as (11:0), the fourth needs 16 LSB lines denoted as (15:0), and the fifth needs 6 LSB lines (5:0), and so forth.

It is customary in the prior art to couple the required number of LSB bus lines to each subsystem. Thus, in the above example with five subsystems, bus lines (5:0) are coupled to all five subsystems, bus line 6 is coupled to four subsystems, bus line 7 is coupled to three subsystems, bus lines (11:8) to two subsystems and bus lines (15:12) to one subsystem. The inputs of each subsystem create an electrical load on the bus lines to which they are coupled. Thus, the loading on the (15:0) bus lines is unequal. Lines (5:0) have five subsystem inputs loading each line, line 6 has four, line 7 has three, lines (11:8) have two and lines (15:12) have only one subsystem input loading each line.

The above-described situation is not desirable for reasons well known in the art. For example, it is wasteful of system power since the all of the subsystem inputs connected to the various LSB lines must be driven irrespective of which subsystem is being addressed. Thus, there continues to be a need for arrangements which distribute the bus loading more evenly.

DETAILED DESCRIPTION OF THE DRAWINGS

Figure 1:
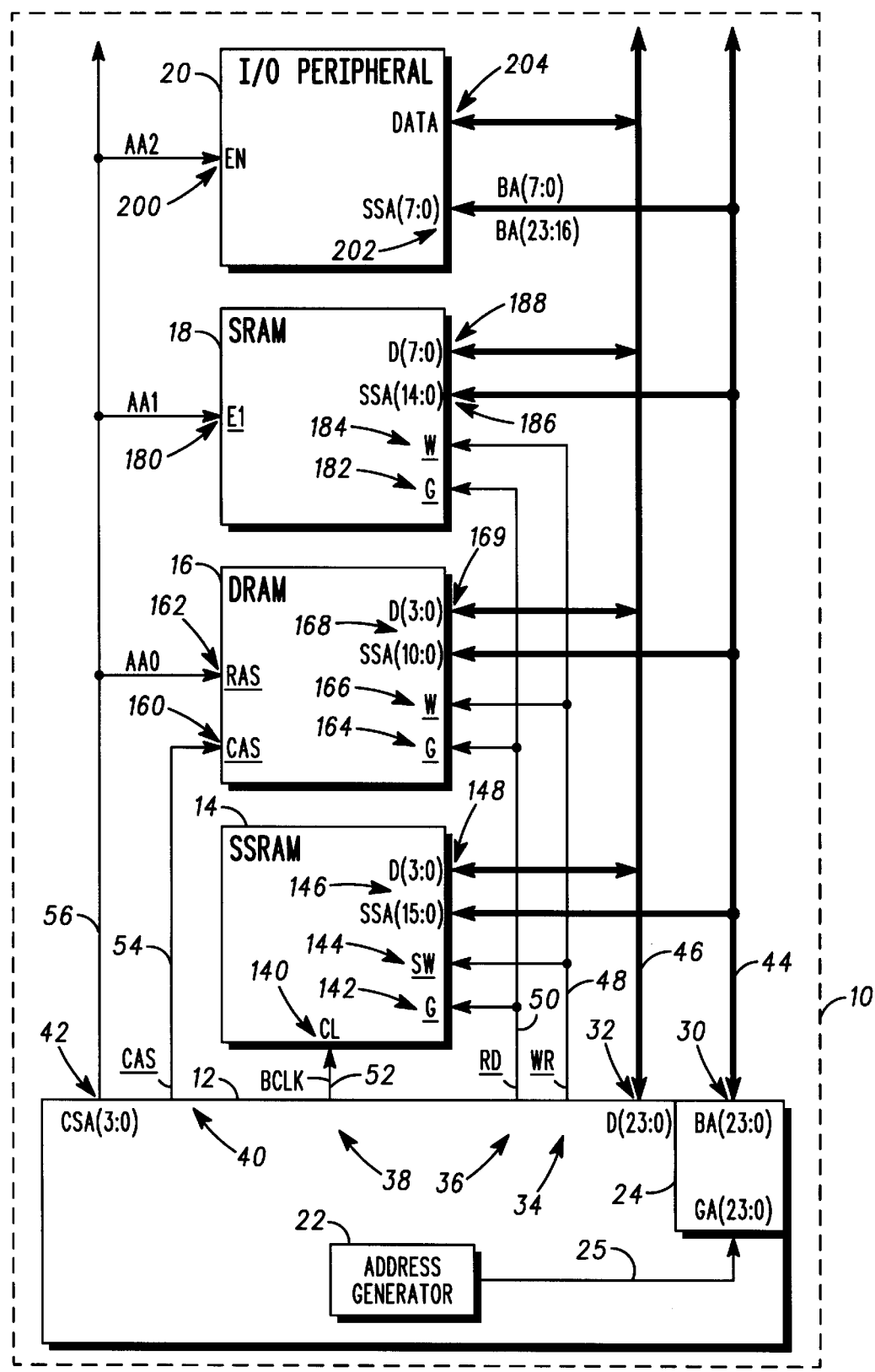
FIG. 1 is a block diagram illustrating a system with subsystems, according to the present invention.

FIG. 1 is a block diagram illustrating system 10 with subsystems 12–20, according to the present invention. System 10 is illustrated as having certain exemplary subsystems 12–20 with particular combinations of data, address and other lines and particular combinations of INT address space, etc., but as those of skill in the art will understand this is merely for convenience of explanation and not intended to be limiting. Subsystems 12–20 are merely representative and illustrative of subsystems having different address requirements and can have any function that the user desires. So, even though blocks 12–20 are referred to as performing specific functions, this is merely for illustrative purposes and not limiting.

In FIG. 1, system 10 is illustrated for the case where subsystem 12 is a processor, subsystem 14 is a synchronous static random access memory (SSRAM), subsystem 16 is dynamic random access memory (DRAM), subsystem 18 is a static random access memory (SRAM) and subsystem 20 is an input-output (I/O) peripheral. Processor 12 has I/O ports 30–42 performing various functions. With the exception of bus address port 30, the exact nature of the remaining I/O ports of processor is not critical.

For purposes of illustration, processor 12 internally incorporates bus address generator 22 and bus controller 24. It is assumed that bus address port 30 has N+1 bus address connections BA(N:0), e.g., BA(23:0), coupled to address bus 44 having corresponding lines, that data port 32 has M+1 data connections D(M:0), e.g., D(23:0), coupled to data bus 46 having corresponding lines, and so forth. For example, write port 34 is coupled to write (WR) line 48, read port 36 is coupled to read (RD) line 50, synchronous memory clock output 38 is coupled to synchronous clock (BCLK) line 52, port 40 is coupled to CAS line 54 and chip select port 42 has Z+1 connections CSA(Z:0), e.g., CSA (3:0), coupled to chip select bus 56 having corresponding Z+1 lines. The choice of N, M, and Z are dependent upon the system design requirements and ports 30–42 can have more or fewer connections depending upon the needs of the system designer and the values used herein for N, M, and Z for ports 30–42 and busses or lines 44–56 are intended to be merely exemplary.

By way of example, subsystem 14 has I/O ports 140–148 coupled to buses or lines 44–52. Address input 146 has sixteen subsystem address connections SSA(15:0) coupled to address lines of bus 44 and data port 148 has four data connections D(3:0) coupled to appropriate lines of data bus 46. Subsystem 16 has I/O ports 160–169 coupled to buses or lines 44–50, 54–56. Address input 168 has eleven subsystem address connections SSA(10:0) coupled to address lines of bus 44 and data port 169 has four data connections D(3:0) coupled to appropriate lines of data bus 46. Subsystem 18 has I/O ports 180–188 coupled to buses or lines 44–50, 54–56. Address input 186 has fifteen subsystem address connections SSA(14:0) coupled to address lines of bus 44 and data port 188 has eight data connections D(7:0) coupled to appropriate lines of data bus 46. Subsystem 20 has I/O ports 200–204 coupled to buses or lines 44–50, 54–56. Address input 202 has eight subsystem address connections SSA(7:0) coupled to address lines of bus 44 and data port 204 is coupled to appropriate lines of data bus 46. It is understood that the above-described subsystems and their internal (INT) address space and other connections are merely exemplary and not intended to be limiting.

For convenience of explanation, the following conventions are adopted: Address generator 22 provides generator addresses GA(23:0) along bus 25 within processor 12 to I/O port 30 via bus controller 24 which is coupled to address bus 44. For convenience of explanation, it is assumed that chip select information, e.g. CSA(3:0), for subsystems 14–20 are provided via port 42 on separate chip select bus 56. This is convenient but not essential. Conversely, if output connection 42 is providing CS as well as INT addresses for the different subsystems, then the CS information can be included as higher order (MSB) connections to the address bus ports 146, 168, 186, 202, etc. and lower order (LSB) address connections SSA(X:0) provided on other bus lines and subsystem connections, where X corresponds to the highest order bit needed for the INT address space of the subsystem. For example, if Z+1 lines are required for CS and Y=N+1−Z where N+1 is the total number of available bus lines, the subsystem address connections including chip select can be SSA(N:Y;X:O).

Use of the highest order connections (N:Y) and corresponding bus lines for the chip select information is convenient but not essential. It is only necessary that the chip select lines (N:Y) and corresponding connections be separated from the subsystem bus connections ($X_{max}$:0), where $X_{max}$, corresponds to the largest internal address for any of the subsystems. For example, where N=23, Z=4 and $X_{max}$=15, then the available addresses range corresponds to SSA (23:20;15:0).

In the prior art, the higher order (MSB) generator addresses GA(23;22;21 . . . etc.) are sent to the higher order bus connections or lines BA(23;22;21 . . . etc.) of bus 44, the lower order (LSB) generator addresses GA(X:0) are sent to the lower order bus connections of lines BA(X:0) of bus 44, and the intermediate order (IB) generator addresses are sent to the corresponding intermediate address (IB) connections or lines of bus 44, that is, those IB addresses lying between (N:N+1−Z) and ($X_{max}$:0).

In the prior art, the lower order (LSB) bus lines BA(X:0) carrying lower order addresses GA(X:0) are coupled to the lower order (LSB) subsystem address connections SSA (X:0). This is indicated in FIG. 1, for example, by the address BA(7:0) appearing at SSA(7:0) input 202 of subsystem 20.

In the present invention, controller 24 is provided between address generator 22 and port 30 coupled to bus 44 for dynamically altering which addresses are applied to which lines of bus 44. In the preferred embodiment, controller 24 uses the CS address, e.g., GA(N:N+1−Z) generated by address generator 22 to determine when a particular one of subsystems 14–20 is being selected and then, in accordance with instructions or information stored within or fed into system 10, placing the lower order addresses GA(X:0), i.e., those addresses which correspond to the internal (INT) address space of the subsystem, from generator 22 on higher order bus connections or lines BA(P:Q).

It is convenient but not essential that the number of bus lines (P:Q) be at least equal to the number of lines needed to address the subsystem address space, that is P+1−Q>X+1. The range (P:Q) can be the highest order (MSB) lines of bus 44 when they are not required for chip select purposes or merely higher order (e.g. IB) lines of bus 44 when the highest (MSB) lines of bus 44 are needed for chip selection purposes. It is only necessary that Q>X, or stated in words, that the INT address space (X:0) of the subsystem be shifted to higher order lines on the bus (Q>X) to which the INT address connections of the subsystem are coupled.

In order that the addresses, e.g., GA(X:0), from generator 22 relate to the corresponding address space, e.g., SSA(X:0), of a given subsystem, the address connection SSA(X:0) is coupled to the bus lines BA(P:Q) to which the generator address GA(X:0) has been directed by controller 24. For example, assuming N=23 and that the MSB lines of bus 44 are not needed for chip select purposes, then, in the case of subsystem 20 where X=7, then generator addresses GA(7:0) are sent to port 30 so as to be coupled to bus lines BA(23:16). These bus lines are coupled to subsystem address connections SSA(7:0) of subsystem 20. In this way, subsystem 20 no longer loads bus lines (X:Q) and the bus loading is more equalized. If the Z MSB lines of bus 44 are used for chip select purposes, then generator addresses GA(X:0) are sent, for example, to bus address lines BA(N−Z:N+1−Z−X) which are coupled to subsystem address connections SSA(X:0).

It will be apparent to those of skill in the art based on the teachings herein that more than one subsystem can be coupled to higher order bus lines which are in turn coupled to the bus connections of particular subsystems so as to more equally distribute the bus loading. For example, assuming that N=23 and that the MSB bus lines are not needed for chip select, generator addresses GA(10:0) and GA(7:0) can be diverted respectively to BA(23:14) and BA(23:17), respectively, and connections SSA(10:0) of subsystem 16 coupled to bus lines (23:14) and connections SSA(7:0) of subsystem 20 coupled to bus lines (23:17) so that each subsystem can properly receive its LSB INT addresses. This more evenly distributes the bus loading.

Figure 2:
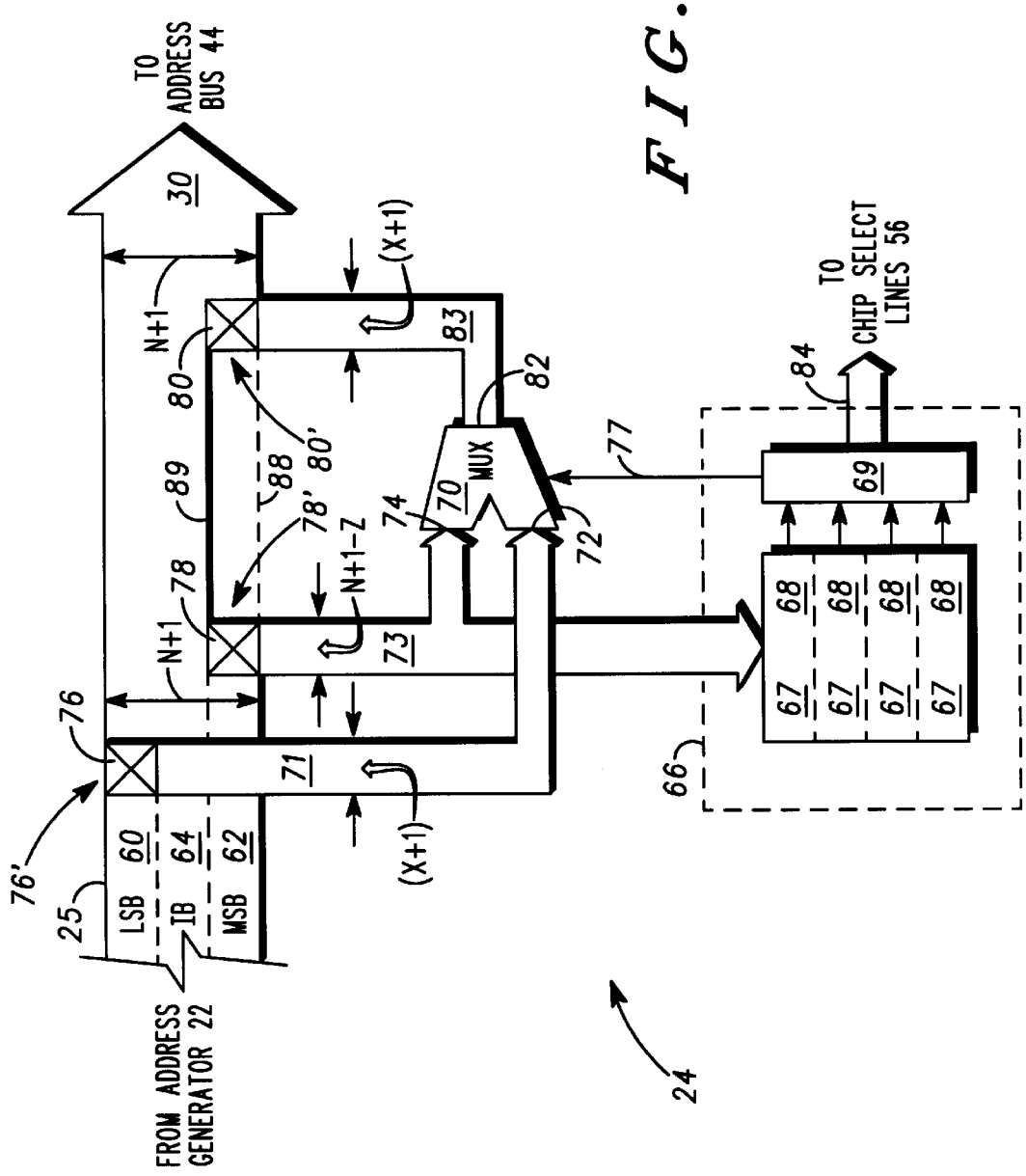
FIG. 2 is a block diagram illustrating further details of a preferred embodiment of the present invention.

FIG. 2 is a block diagram illustrating further details of controller 24 of system 10 according to a preferred embodiment of the present invention. Bus 25 from address generator 22 is shown as comprising lower order (LSB) addresses 60, higher order (MSB) addresses 62 and intermediate (IB) addresses 64. Controller 24 comprises comparer 66 and multiplexer (MUX) 70. Comparer 66 desirably comprises multiple storage elements 67 and subsidiary comparers 68 (one set for each CS line needed) and decoder 69. MUX 70 has first input 72 of width X+1 (where X is the largest lower order address to be shifted to higher order bus lines), and second input 74 of similar width. First input 72 is coupled via bus 71 to lower order (LSB) addresses 76' of bus 23 on lines 60 at connection 76 and second input 74 is coupled via bus 73 to the higher order CS addresses 78' of bus 23 found, in this example, on MSB lines 62 at connection 78.

Comparer 66 determines when chip select (MSB) address 78' corresponds to a predetermined subsystem address for which it is desired to place lower order (LSB) addresses 76' on the higher order (e.g., MSB) address lines 62 at connection 80. In this situation, MSB lines 62 are interrupted at 89 so that there is no direct connection between 78 and 80.

When the address of the predetermined subsystem is detected at 78 by comparer 66, it commands MUX via output 77 to couple MUX output 82 to MUX input 72 so that LSB addresses 76' are coupled to MSB lines 62 at connection 80 of port 30 and thereby via MSB lines 62 of bus 44 to address connections SSA(X:0) of the selected peripheral. Controller 24 also conveniently provides chip select output 84 to chip select bus 56.

When separate chip select bus 56 is not used, then output 82 of MUX 70 can be coupled to intermediate (IB) bus lines 64 and chip select addresses remain on bus lines 62 as indicated by dashed line 88. In this situation, connection 80 lies on bus lines 64. By use of a four-port MUX (not shown) having inputs as shown and one output coupled to bus lines 62 and another output coupled to bus lines 64, either option can be made available. For example, LSB addresses can be switched to either MSB lines 62 or IB lines 64. MSB addresses are switched to MSB lines 62 when LSB addresses present on lines 60 are switched to IB lines 64 or left on LSB lines 60 but not when LSB addresses are switched to lines 62.

Figure 3:
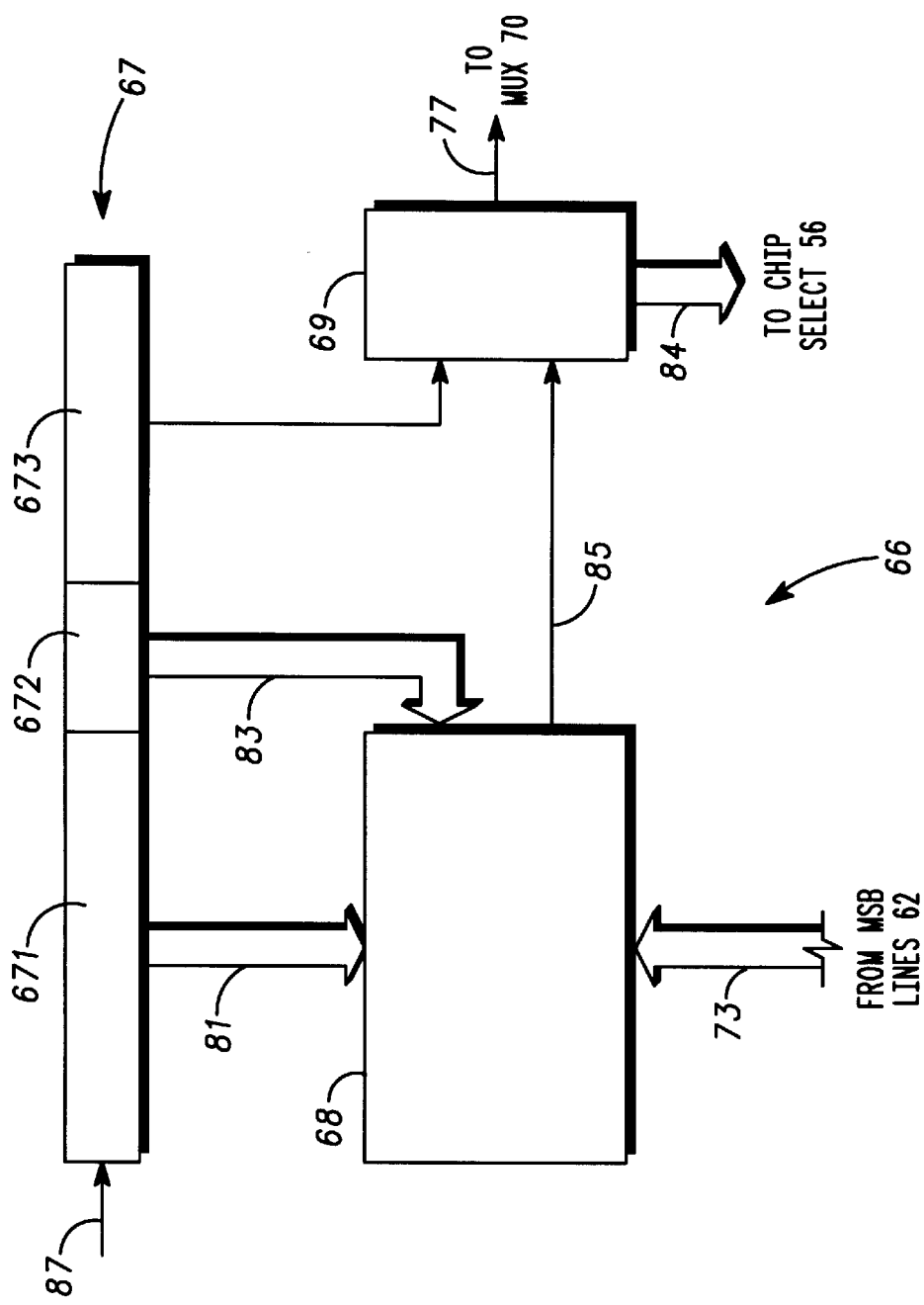
FIG. 3 is a block diagram illustrating still further details of a preferred embodiment of the present invention.

FIG. 3 is a block diagram of comparer 66 illustrating still further details of a preferred embodiment of the present invention. Comparer 66 comprises subsidiary storage means 67, as for example a shift register or other form of memory element (any kind can be used) and subsidiary comparer 68. Storage means 67 is loaded via input 88, e.g., either an external input or from other memory associated with system 10. Subsidiary comparer 68 receives input CS addresses 78' via bus 73 from the chip select (e.g., MSB) lines 62 of bus 23 and inputs 81, 83 from storage means 67. Input 81 provides a reference chip select address (e.g., CS') from portion 671 of storage means 67, e.g., the chip select address CS' of that subsystem (or subsystems) that is intended to have its LSB addresses steered to the MSB of the bus or other higher order bus lines. Input 83 desirably provides from portion 672 of storage means 67 the number of bits of stored CS' address on input 83 to be compared to the current CS address received on input bus 73, or vice versa.

Assuming that four chip select lines are used in the system, there are four storage means 67 (loaded via inputs 87) and comparers 68. Four comparisons are done in parallel in order to determine which chip select is valid, and the results sent to decoder or control block 69 on output 85. Control block 69 decides which of the four registers should provide the current chip select address. This is done to eliminate the possibility of multiple CS outputs (CS(3:0)) active at the same time when, for example, one is tied to a device whose SSA(7:0) port is connected to BA(7:0), and another's SSA(7:0) port is connected to BA(23:16). This is also done to allow processor 12 to decide if and how to activate other control lines, such as for example, WR, RD and CAS outputs, according to predetermined information stored in portion 673.

Portion 673 of storage means 67 desirably contains a bit which is used by control block 69 to generate output 77 according to predetermined information in the selected register. Output 77 of control block 69 drives MUX 70. Output 84 of control block 69 provides chip select signals to chip select bus 56. With this arrangement, it is convenient for chip select bus 56 to comprise individual chip select lines running to separate subsystems, e.g., lines AA0, AA1, AA2, etc. Control block 69 determines which of lines AA0, AA1, AA2 will be active.

While FIGS. 2–3 illustrate a preferred means of making the comparison and steering the bus address signals, this is not intended to be limiting. Persons of skill in the art will understand based on the description herein that many other arrangements for accomplishing dynamic steering of lower order bus addresses in response to the subsystem select address can be provided.

Figure 4:
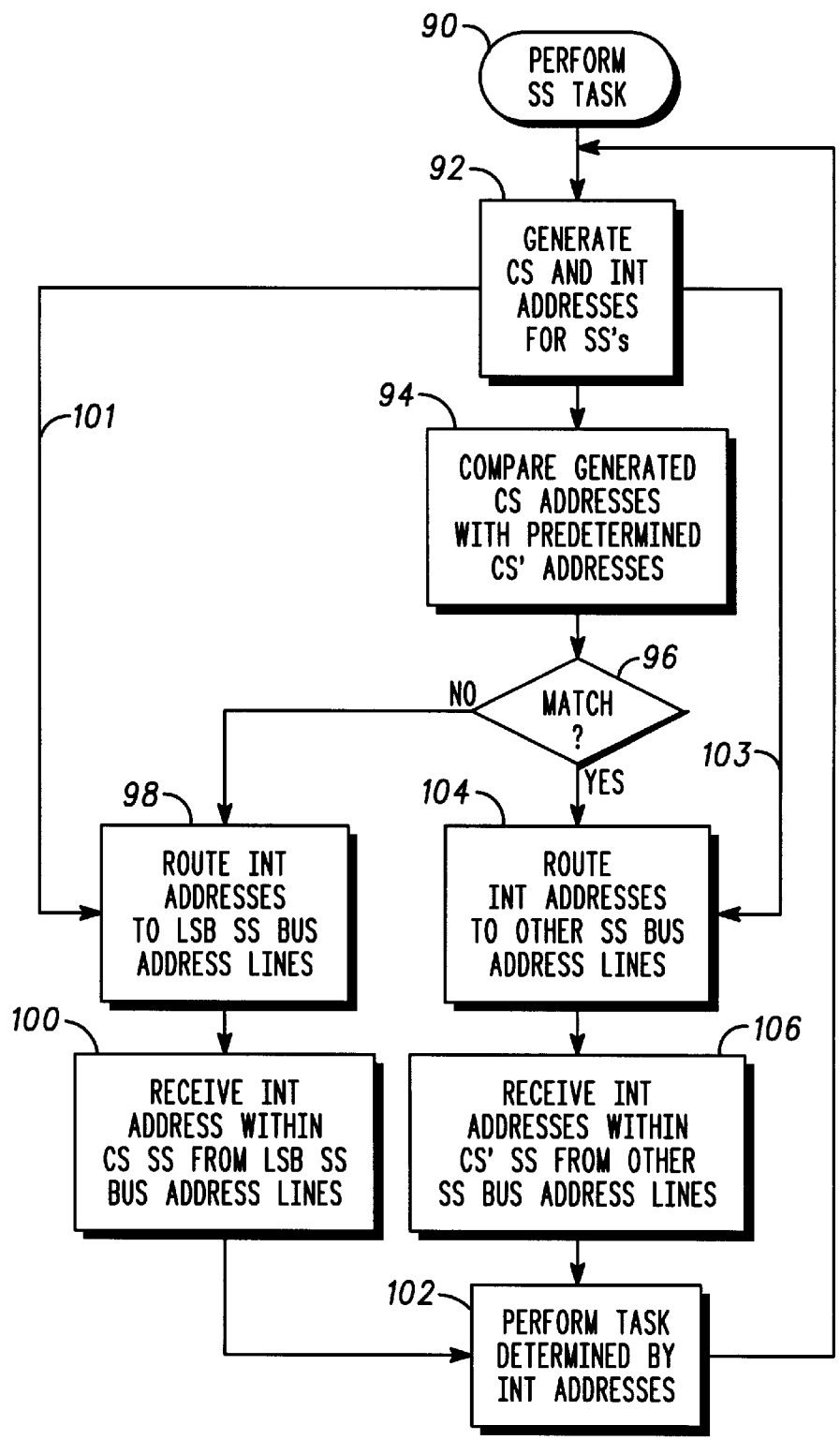
FIG. 4 is a simplified flow chart illustrating a preferred embodiment of a method of the present invention.

FIG. 4 is a simplified flow chart illustrating a preferred embodiment of method 90 for performing a subsystem task of the present invention. The abbreviation "SS" is used for "subsystem", "CS" for "chip select", "INT" for "internal", "LSB" for "least significant bit" in FIG. 4. Thus, the "INT addresses" correspond to the internal address space within a subsystem and the "CS addresses" correspond to the addresses needed to select a particular subsystem. The total address for executing a task involving a subsystem is therefore a combination of the CS address (needed to identify the particular subsystem) plus the INT addresses (needed to define the address space being accessed within the subsystem).

Perform SS Task 90 begins with step 92 in which the CS and INT addresses are generated by address generator 22. In step 94, the CS portion of the generated address is compared with a predetermined chip select address (e.g., CS') and query 96 executed to determined if there is a match. Where a bit flag is used to identify the addresses to be multiplexed, query 69 can include a test as to whether the multiplexed address bit flag is set in the appropriate register.

If there is no match (outcome "NO") then in step 98 the INT addresses are routed to the LSB SS bus address lines and in step 100 the INT addresses are received within the subsystem (SS) identified by the CS information from the LSB SS bus address lines and in step 102 the task determined by the INT addresses, whatever that maybe, is performed, and operation thereafter returned to step 92.

If the result of query step 96 is a match (outcome "YES") then in step 104, the INT addresses are routed to other SS bus lines, i.e., higher order lines, not the LSB bus lines, and in step 106 the INT addresses are received within the subsystem identified by the CS address from the other SS bus address lines. Operation then proceeds to step 102 wherein the task determined by the INT addresses is performed and thereafter control returned to step 92. As indicated by lines 101, 103 the INT addresses are communicated from step 92 to steps 98, 104, respectively, so as to be available for routing.

It will be apparent based on the description herein that selected subsystems can have their INT address connections coupled to whatever bus lines are desired in order to more uniformly load the bus. It will also be apparent that, although particular bus connections or lines are referred to using the convention (A:B) representing connections or lines (A;A–1;A–2 . . . B–2;B–1;B), this refers to logical connections. The order and arrangement of the physical connections and bus lines can be arbitrary, provided that the logical coupling provided herein is satisfied. Thus, the terms MSB, IB and LSB have logical significance as higher order, intermediate order and lowest order logical addresses or address connection. The actual physical addresses, connections and lines depend upon the logic representation used and therefore can be different. Persons of skill in the art will understand how to build a physically realizable system based on the description herein and techniques well known in the art.

While address generator 22 and bus control 24 have been described herein as being internal to processor 12, this is not essential and one or more can be external to processor 12. For example, address generator 22 can be internal to processor 12 and bus control logic inserted between processor port 30 and bus 44, external to processor 12. Various other arrangements as will occur to those of skill in the art based on the description herein will also serve.

It is intended to include in the claims that follow, the forgoing and such other equivalent arrangements and methods as will occur to those of skill in the art based on the teachings herein.

We claim:

1. A system having multiple subsystems, comprising:

(a) an address bus coupled to the multiple subsystems and including higher order address lines and lower order address lines;

(b) a first subsystem having first address connections for receiving lower order addresses identifying an address space within the first subsystem, the first address connections being coupled to a subset of higher order address lines of the address bus not used for selecting the first subsystem;

(c) an address generator coupled to the address bus for providing subsystem select addresses and lower order addresses;

(d) a control means coupled to the address generator and the bus for interpreting the subsystem select addresses provided by the address generator and coupling the lower order addresses to the subset of higher order address lines when a subsystem select address from the address generator equals a subsystem select address of the first subsystem, but not when it equals a select address of another of the multiple subsystems.

2. The system of claim 1 wherein the control means comprises a storage means and a comparer for comparing the subsystem select address generated by the address generator with another subsystem select address stored in the storage means and coupling the lower order addresses to the subset of higher order address lines when there is a match.

3. The system of claim 1 wherein the control means comprises a bus multiplexer having an output coupled to the subset of higher order address lines of the bus and having a first input coupled to the address generator for receiving lower order addresses and a second input coupled to the address generator for receiving subsystem select addresses, wherein the bus multiplexer directs addresses at its first input to its output when a comparer in the control means detects a match between the subsystem select address being provided by the address generator and the another subsystem select address stored in the control means.

4. A method for operating a system having an address generator, an address bus, a bus controller, and multiple subsystems coupled by the address bus, the address bus including higher order address lines and lower order address lines, and wherein a first subsystem has a first subsystem select address and lower order address connections for receiving lower order addresses identifying an address space within the first subsystem, the method comprising:

(a) operating the address generator coupled to the bus controller for providing addresses, including a subsystem select addresses and lower order addresses;

(b) operating the bus controller to (i) receive the subsystem select addresses provided by the address generator and (ii) couple the lower order addresses from the address generator to a subset of the higher order address lines of the bus not used for subsystem select, when the subsystem select address from the address generator equals the first subsystem select address, but not when it equals a select address of another of the multiple subsystems.

5. The method of claim 4 wherein the step of operating the bus controller comprises retrieving the first subsystem select address from storage and comparing the subsystem select addresses generated by the address generator with the first subsystem select address to determine a match.

6. The method of claim 5 wherein the step of operating the bus controller comprises supplying lower order addresses from the address generator to the subset of higher order lines of the bus by means of a multiplexer activated by the bus controller.

7. A method for operating a system with more equally distributing bus line loading, said system having multiple peripherals using different numbers of address bits, said peripherals being served by a bus, said method comprising the steps of, dynamically mapping lower order internal address bits of at least one selected peripheral, but not of another selected peripheral, to higher order address lines of the bus that are not used to select the at least one selected peripheral, so that some lower address lines of the bus need not be loaded by the selected peripheral.

8. The method of claim 7 wherein, when the bus has N+1 lines and X+1 bits are used for the lower order internal address bits and Z+1 address bits are used for peripheral select, then mapping the X+1 lower order internal address bits to higher order bus address lines for bits in a range between (N+1)–(Z+1) and (X+1).

* * * * *